United States Patent Office 3,522,213
Patented July 28, 1970

3,522,213
CROSS-LINKED URETHANES AND UREAS
Gerhard Grogler and Erwin Windemuth, Leverkusen, Germany, assignors to Farbenfabriken Bayer Aktiengesellschaft, Leverkusen, Germany, a corporation of Germany
No Drawing. Filed Mar. 20, 1967, Ser. No. 624,218
Claims priority, application Germany, Mar. 19, 1966, F 48,709
Int. Cl. C08g 22/16, 22/04
U.S. Cl. 260—75                                        10 Claims

ABSTRACT OF THE DISCLOSURE

A process for preparing iminopolymers by reacting an N-substituted ethylenimine which contains at least one hydrogen atom reactive with an NCO group, with a urethane containing at least two free NCO groups and then cross-linking the iminopolymer to obtain cross-linked urethanes and ureas which are especially useful as coating compositions and casting resins.

---

This invention relates to an improved process for the preparation of iminopolymers, as well as cross-linked urethanes and ureas, containing an aziridine nucleus isolated from the urethane and urea groups thereof, and to improved plastics obtainable therefrom, including the preparation of coating compositions having improved properties.

It has been proposed heretofore to prepare plastics from monomeric organic polyisocyanates and alkylene imines by mixing the polyisocyanate and the imine to obtain a polyethylene urea which is subsequently converted into a cross-linked plastic by heating either alone or in conjunction with an acid catalyst. The disadvantage of this process is that the conversion to the cross-linked product is difficult to control due to the high reactivity of polyethylene ureas obtained from a monomeric organic polyisocyanate and an alkylene imine. Moreover, the final products cannot be adapted to a variety of uses because of the limited number and nature of the starting materials used in the preparation of the polyethylene ureas.

Further, when such polymers are alternatively prepared from ethylenimine, the N,N-alkylene urea which is obtained may only be employed in limited applications because of its instability in a solution which progressively increases in viscosity at room temperature until it gels and then completely solidifies. It has been found further that this undesirable result cannot be prevented by using basic auxiliary agents, since such agents have no stabilizing effect on this phenomenon.

In addition, those N,N-alkylene ureas which are prepared from alkylene imines and isocyanate-modified polyurethane masses having an NCO content of less than about 3% are incapable of being completely hardened by heat treatment since only a very small number of sites are available in such polymers for the formation of bridges between polymeric chains in the cross-linking reaction.

It is therefore an object of this invention to provide iminopolymers and cross-linked urethanes and ureas which are devoid of the foregoing disadvantages.

It is a further object of this invention to provide a method for the preparation of cross-linked urethanes and ureas which is devoid of the prior art disadvantages.

Another object of this invention is to provide unique iminopolymers which may be easily cross-linked to form hard insoluble plastics.

Still another object of this invention is to provide iminopolymers as well as cross-linked urethanes and ureas which contain an aziridine ring isolated from the urethane and urea groupings.

A further object of this invention is to provide a unique iminopolymer to be used in the preparation of cross-linked urethanes and ureas which is storage stable and exerts an advantageous effect on the subsequent cross-linking reaction and in the finished product.

An additional object of this invention is to provide substantially non-porous lacquers, impregnations, finishes for articles, textiles, paper, and the like, adhesives, and sheet-type structures which may be either hydrophilic or strongly hydrophobic, as well as cold-hardening casting resins or heat-hardening casting resins.

The foregoing objects and others which will become apparent from the following description are accomplished in accordance with this invention, generally speaking, by providing iminopolymers obtained by reacting an N-substituted ethylenimine, the N-substituent of which contains at least one hydrogen atom reactive with an NCO group, with a urethane containing at least two free NCO groups, and the cross-linked urethane and urea plastics obtained therefrom. The invention therefore contemplates an improved process for the preparation of iminopolymers containing aziridine rings isolated from the urethane groupings which are suitable for conversion into cross-linked insoluble plastics containing aziridine rings isolated from the urethane and urea groupings, by the application of heat, or the use of an alkylating agent, acid, or a b-chloroethyl urethane.

The cross-linked plastics obtained by the process of the instant invention are greatly improved over those obtained from organic polyisocyanates and alkylene imines, including poly-N,N-ethylene ureas, because the cross-linking reaction can be controlled to such an extent that they may even be used for the coating of textiles and the like. Further, there is no longer a solidification problem since the iminopolymers remain storage stable due to the presence of the isolated aziridine ring in the polymer. The iminopolymers are therefore liquid to resinous masses which are stable on storage, either alone or with the addition of any suitable stabilizer.

In accordance with a preferred embodiment of this invention, a urethane containing at least two free NCO groups is prepared in a first step by reacting an excess of an organic polyisocyanate with an organic compound containing at least two active hydrogen groups which are reactive with NCO groups; the polymer obtained is then reacted in a second step with an N-substituted ethylenimine to yield an iminopolymer which may then be further reacted either alone or with the aid of a suitable cross-linking agent to yield an improved cross-linked plastic material containing aziridine rings isolated from the urethane and urea groupings.

Any suitable organic compound containing at least one active hydrogen containing group may be used in accordance with the process of the present invention for reaction with an excess of an organic polyisocyanate to prepare the aforementioned urethane having at least two free NCO groups. Suitable compounds of this type include polyhydric alcohols, polyhydric phenols, polyhydric polyalkylene ethers, polyacetals, polyhydric polythioethers, hydroxyl polyesters, polyamines, monohydric alcohols, monoamines and the like. While the invention contemplates low molecular weight alcohols and amines including ethylene glycol and ethylene diamine, it is preferred to employ organic compounds which have a molecular weight of at least about 150 and best results are obtained when compounds are used which have a molecular weight between about 150 and about 2000 and which have an hydroxyl number within the range of from about 56 to about 750 and acid numbers, where they are applicable, below about five and most preferably below one. Any suitable polyhydric alcohol may be used such as, for example, ethylene glycol, propylene glycols of the general formula:

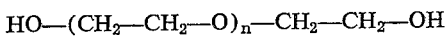

or

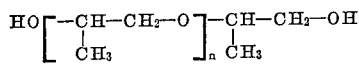

in which $n$ denotes an integer greater than 1, 1,4-butane diol, 1,3-butane diol, 1,6-hexane diol, octadec-9,10-ene-1,12-diol, thiodiglycol, 2,2-dimethyl propane-1,3-diol, 1,18-octadecane diol, 2-ethyl hexane-1,3-diol, 2,4-dimethyl-2-propyl heptane-1,3-diol, 2-butene-1,4-diol, 2-butine-1,4-diol, diethylene glycol, triethylene glycol, glycerine, hexane-1,2,6-triol, triethanolamine, pentaerythritol, quinitol, sorbitol, hexahydropyrocatechol, 4,4'-dihydroxy-dicyclohexyl dimethylmethane, N-methyl diethanolamine and the like and mixtures thereof.

Any suitable polyhydric phenol may be used such as, for example, o, m and p-dihydroxy benzene, 1,3,5-tridroxy benzene, 4,4' - dihydroxydiphenyl, 6,6' - dihydroxy - 3,3'-diethyldiphenyl, 2,2'- or 4,4'-dihydroxydibenzyl, 4,4'-dihydroxydiphenyldimethylmethane, p,p'-dihydroxydiphenylmethane, 4,4'-dihydroxydiphenyl - 1,1 - isobutane, polymethylene-bis-phenols of the type $$HO—C_6H_4—(CH_2)_n—C_6H_4—OH$$

in which $n$ can be a whole number up to 18, trinuclear bisphenols in which the nuclei are connected to one another by —CH$_2$—CH$_2$— groups, hydroquinone ethylene diethers, dihydroxybenzophenones of the formula $$HO—C_6H_4—CO—C_6H_4—OH$$

bisphenol sulphides of the formula $$HO—C_6H_4(S)_n—C_6H_4—OH$$

in which $n$ can be a whole number up to 3 and the benzene nuclei can be substituted, 4,4'-dihydroxydiphenyl sulphone, di-(hydroxyl-p-tertiary-butyl-benzyl)-cyclohexylamine, tetra-(hydroxybenzyl)-alkylene diamines such as tetra-(hydroxydimethylbenzyl)-ethylene diamine and the like and mixtures thereof.

Any suitable linear or branched polyhydric polyalkylene ether may be used such as are obtained, for example, by the condensation of one or more mols of an alkylene oxide either alone or together with one of the aforementined polyhydric alcohols as well as those obtained from tetrahydrofurane and epihalohydrins such as epichlorohydrin. Any suitable alkylene oxide may be used, such as, for example, ethylene oxide, propylene oxide, butylene oxide, amylene oxide, styrene oxide and the like and mixtures thereof. It is also possible to prepare polyhydric polyalkylene ethers suitable for use in accordance with the present invention by reacting alkylene oxides such as those listed herein with aliphatic, hydroaromatic and/or aromatic monofunctional or polyfunctional amines and/or amino alcohols such as, for example, ethanolamine, diethanolamine, ethylene diamine, cyclohexylamine, aniline and the like as well as polycarboxylic acids such as adipic acid, hydroxy carboxylic acids such as ricinoleic acid, polycarboxylic acid amines such as, for example, pyridine 2,3-bicarboxylic acid and/or polycarboxylic acid sulphamides such as succinic acid disulphoamide and the like and mixtures thereof.

Any suitable polyacetal may be used such as those disclosed in German Pats. 1,039,744 and 1,045,095 which may be obtained, for example, by reaction of any suitable polyhydric alcohol as more particularly set forth above with any suitable aldehyde and preferably formaldehyde.

Any suitable polyhydric polythioether may be used such as is obtained, for example, from thiodiglycol or other thioglycol either alone or in conjunction with polyhydric alcohols, examples for which are set forth above.

Any suitable linear or branched polyester may be used but it is preferred to employ alcoholic hydroxyl terminated polyesters obtained from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, b-hydromuconic acid, a-butyl-a-ethyl-glutaric acid, a-b-diethylsuccinic acid, isophthalic acid, terephthalic acid, hemimellitic acid, trimellitic acid, trimesic acid, phthalic acid, tetrachlorophthalic acid, mellophanic acid, prehnitic acid, pyromellitic acid, benzene-pentacarboxylic acid, 1,4-cyclohexanedicarboxylic acid, 3,4,9,10-perylenetetracarboxylic acid and the like and mixtures thereof. Any suitable polyhydric alcohol including those more specifically disclosed above as well as alkanolamines such as, for example, ethanolamine may be used. Also, polyhydroxy carboxylic acids, amino carboxylic acids, lactams and/or lactones may be used in the preparation of the polyesters including ricinoleic acid, hydroxystearic acid as well as dimerized and trimerized unsaturated fatty acids. The term "polyester" also includes polyester amides which may be obtained by including some amine such as ethylene diamine or one of the above-mentioned amino carboxylic acids in the reaction mixture.

Any suitable polyamine may be used such as, for example, ethylene diamine, aniline, p-aminoaniline, polymers of the type set forth above which have terminal primary or secondary amino groups and the like and mixtures thereof.

Organic compounds which contain only one active hydrogen containing group should only be used in conjunction with organic polyisocyanates which contain at least three isocyanate groups. Compounds of this type include for example, the monohydric alcohols which have the general formula R—OH in which R may be a linear, branched, saturated or unsaturated alkyl, cycloalkyl, aralkyl or aryl group which may also contain hetero atoms or other substituents such as, for example, ethyl alcohol, 2-methyl-butane-4-ol, allyl alcohol, octadec-9-ene-1-ol, fatty alcohols with 12 to 20 carbon atoms, propargyl alcohol, hexanediolmonomethyl ether, ethylene glycol monoacetate, 1,2-epoxy-3-oxypropane, cyclohexanol, benzyl alcohol, phenylethyl alcohol, cinnamyl alcohol, phenol, cresols, xylenols, p-allyl phenol and the like and mixtures thereof. In addition, monofunctional alcohols which are obtained by addition of one or more mols of an alkylene oxide such as ethylene oxide, propylene oxide, 1,2- or 2,3-butylene oxide, epichlorohydrin, styrene oxide and the like to the aforesaid alcohols or to mercaptans, such as ethyl mercaptan and the like, monocarboxylic acids, such as acetic acid, phenyl acetic acid and the like, carboxylic acid amides, such as acetamide, benzamide and the like, secondary aliphatic, araliphatic and aromatic amines, such as N,N-dimethyl amine, N-phenyl-N-methyl amine, N,N-diphenyl amine, N,N-dibenzyl amine and the like and sulfonamides such as benzenesulfonamide and the like may be used and mixtures thereof.

Any suitable monofunctional and/or polyfunctional isocyanate can be used in the production of prepolymer. Since the prepolymer must have at least two isocyanate groups, monofuctional isocyanates can only be used for modification purposes. For example, one mol of a trihydric alcohol and one mol of a monoisocyanate, may be reacted to obtain a urethane which is suitable for further reaction with polyisocyanates and thereafter with the N-substituted ethylenimines of this invention. Valuable modifications can be produced by varying the organic radical, R, of the monoisocyanate, R—NCO. Any suitable organic radical may be R in the formula, R—NCO, including aliphatic, araliphatic, alicyclic, aromatic and heterocyclic radicals such as, for example, methyl, ethyl, allyl, n-butyl, tertiary-butyl, dodecyl, octadecyl, oleyl, cyclohexyl, 1-chloro-6-hexyl, 1-cyano-3-propyl, benzyl, tolyl, phenyl, furfuryl and the like. In addition, isocyanatoacetic acid ethyl esters, isocyanatocaproic acid esters, ethyl ether propyl isocyanate, n-butyl-glycol ether propyl isocyanate, phenyl-o-, m- and p-tolyl isocyanates, benzyl, phenylethyl, diphenylmethane-4,3,4,6-trichlorophenyl, nitrophenyl, chlorophenyl, m-cyanophenyl isocyanates, as well as isocyanates of naphthalene or polynuclear ring systems such as 1-naphthyl or 2-naphthyl or phenanthryl-3-isocyanates may be used and the like and mixtures thereof.

The following are mentioned as examples of suitable polyisocyanates, which can either be used alone or in any desired mixture: Aliphatic diisocyanates, of the general formula OCN—R—NCO, wherein R represents a linear or branched, saturated or unsaturated alkylene radical, which can also be interrupted by hetero atoms such as oxygen or sulfur. Examples of these are tetra- or hexamethylene diisocyanates, butene diisocyanates, dithiodiethyl or thiodipropyl diisocyanates, 2,2-dimethylpentane diisocyanate, omega,omega'-dipropyl-ether diisocyanate, 1,4-butylene glycol dipropyl ether diisocyanate and the like. Aliphatic diisocyanates with built-in ring systems such as, for example, omega,omega'-diisocyanate-1,4-dimethyl-cyclohexane, omega,omega'-diisocyanate-1,4-diethyl benzene and the like and mixtures thereof.

Hydroaromatic diisocyanates may be the organic polyisocyanate such as cyclohexane-1,3- or cyclohexane-1,4-diisocyanates, 1-methyl-cyclohexane-2,4-diisocyanates, dicyclohexyl methane-4,4'-diisocyanate, dicyclohexyl dimethyl methane-4,4'-diisocyanate, 2,2'-dimethyl-dicyclohexyl methane-4,4'-diisocyanate and the like and mixtures thereof.

Aromatic-aliphatic or aromatic-hydroaromatic diisocyanates may be the organic polyisocyanate such as 4-phenyl isocyanate-b-ethyl isocyanate, hexahydrobenzidine-4,4'- or hexahydrodiphenyl methane-4,4'-diisocyanates, 3-phenyl isocyanate-a-ethyl isocyanate and the like and mixtures thereof.

Diisocyanates of benzene and its homologues such as 1,3- or 1,4-phenylene diisocyanates, 1-alkyl benzene-2,4-, 2,6-, 2,5-, 3,5-diisocyanates, more especially toluylene-2,4- and 2,6-diisocyanates, mixtures of the two isomers for example in the ratio 65:35 or 80:20, 1-methyl-3,5-diethylbenzene-2,4-diisocyanate, diisopropyl benzene diisocyanate and the like may be used, and mixtures thereof.

Diisocyanates of substitution products of benzene may be used, such as, for example, 1-chlorobenzene-2,4-diisocyanate, dichloro-benzene diisocyanates, 1-nitrobenzene-2,4-diisocyanate, 1-methoxy-benzene-2,4 - diisocyanate, azobenzene - 4,4'-diisocyanate, diphenylether-4,4'-diisocyanate and the like and mixtures thereof. Diisocyanates of naphthalene such as naphthalene-1,4-, 1,5- and 2,6-diisocyanates and the like may be used, and mixtures thereof. Diisocyanates of biphenyl or deriving from diphenylmethane, such as, for example, benzidine diisocyanate, 3,3'-dimethyldiphenyl-4,4'-diisocyanate, diphenylmethane-4,4'-diisocyanate, diphenyl-dimethylmethane diisocyanates, benzophenone-3,3'-diisocyanate and the like may be used, and mixtures thereof. In addition, diisocyanates of polynuclear ring systems such as 1,5-naphthalene diisocyanate and the like sulphur-containing aromatic diisocyanates, such as p,p'-diisocyanato-diphenyl sulfide, triisocyanates and tetraisocyanates, such as 1-methyl-benzene-2,4,6-triisocyanate, triphenyl methane-4,4',4''-triisocyanate, 2,2',4,4'-diphenylmethane tetraisocyanate and the like and mixtures thereof.

Furthermore, polyisocyanates of higher molecular weight and containing urethane groups, such as, for example, a triisocyanate obtained by the reaction of one mol of trimethylol propane and three mols of toluylene-2,4-diisocyanate and having an NCO content of about 19.2 percent, and isocyanates or isocyanate combinations partially formed in accordance with a perhydrotriazine ring cyclization, for example according to German Pat. 951,168, are suitable as polyisocyanates in accordance with the present invention.

In the preparation of the prepolymer, an excess of the organic isocyanate is used. It is necessary to use an overall proportion of NCO groups to reactive hydrogen atom groups which is at least sufficient to provide an NCO to active hydrogen containing group ratio of two so that reaction with all of the active hydrogen containing groups will take place and leave urethanes which contain at least two free NCO groups.

In some cases and particularly where solid components are used to form the urethane polymers having free NCO groups a solvent for the reaction mixture is required. These solvents should be substantially anhydrous and should contain no hydrogen atoms which will react with an isocyanate. Any suitable solvent of this type may be used such as, for example, acetone, ethyl acetate, butyl acetate, ethylene glycol monoethylether acetate, halogenated aliphatic or aromatic solvents such as, for example, methylene chloride, o-dichlorobenzene as well as saturated and unsaturated hydrocarbons including for example xylene, toluene, benzene, benzine, heptane, hexane and the like.

It is seldom necessary to use accelerators for the preparation of the urethane polymers but where they are required, any suitable accelerator may be used such as, for example, tertiary amines, such as, N-ethyl morpholine and the like as well as metal compounds which may be either organic or inorganic such as, for example, stannous chloride and dibutyl-tin-di-2-ethyl hexoate and the like. Substances which are capable of forming hydroxyl ions or substituted hydroxyl ions may also be used as the accelerator. Some such suitable compounds are, for example, sodium methylate, potassium ethylate.

The urethanes containing free NCO groups are then reacted with N-substituted ethylenimines, the N-substituent of which contains at least one hydrogen atom reactive with an NCO group. The ethylenimines to be used in this invention have the formula:

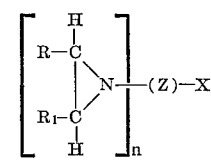

wherein $n$ is an integer of 1 or 2, R and $R_1$ are hydrogen or the same or different alkyl radicals having from 1 to 30 carbon atoms; Z is a branched or straight chain, saturated or unsaturated, hetero-containing or homologous radical having from 2 to 30 carbon atoms and X is OH, NHR or

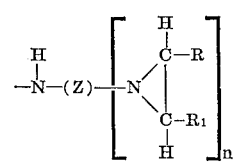

wherein $n$, Z, R and $R_1$ are as herein defined.

R and $R_1$ may be any suitable alkyl radical such as, for example, methyl, ethyl, propyl, butyl, pentyl, hexyl, octyl, decyl, eicosanyl and the like. Z may be any suitable straight chain or branched saturated radical such as, for example, methyl, ethyl, propyl, isopropyl, butyl, isobutyl, octyl, isoctyl, 4,4-dimethylpentyl, eicosanyl, 8,8-dibutyldecyl, 3-methyl-7-butyldodecyl, 5-decyleicosanyl, and the like; any suitable straight chain or branched unsaturated radical such as, for example, ethylene, acetylene, butene-2, butadiene, hexadiene, hexene-4, heptadiene-3,5, decatriene-1,3,6,eicosylene, 3 - methyl-6-pentyldecene-5, 10,10-didecyleicosylene and the like; any suitable hetero-containing radical such as, for example, triethylene amine, dimethylsulfone, tripentylphosphite, and the like and mixtures thereof. The ethylene imines are compounds well-known in the art; they can be prepared e.g. in accordance with and following the instructions of H. Wenker, "Am. Soc." 57, 2328 (1935) and S. Gabriel u. H. Ohle B 50, 1950 (1919).

Some specific examples of suitable ethylene imines within the scope of the formula are, for example, b-ethyleniminoethylamine,
di-b-ethyleniminoethylamine,
g-ethyleniminopropylamine,
di-g-ethyleniminopropylamine,
g-2-methylethyleniminopropylamine,
g-2,3-dimethylethyleniminopropylamine,
b-ethyleniminoethanol,
b-ethyleniminoethyl-g-aminopropylether,
g-ethyleniminopropyl-a-hydroxyethylurethane,
di(ethyleniminopropane)amine,
di(2-methyl-3-decylethylenimino)ethyleneamine,
ethyleniminoacetyleneamine,
di(2-propyl-3-butylethylenimino)decatriene-1,3,6-ol-10,
ethylenimino-5-pentene-3,decene-7-ol-10,
2-butylethylenimino-5-decyl-eicosanol-20,
2-butylethylenimino-5-decyl-eicosanylamine-22,
1-(2-methylamino-ethyl)-aziridine,
1-(2-amino-2-methyl-ethyl)-2-methyl-aziridine,
1-(2-methylamino-2-methyl-ethyl)-2-methyl-aziridine,
1-(2-aminoisobutyl)-2,2-dimethyl-aziridine,
1-(5-amino-pentyl)-aziridine,
1-(7-amino-heptyl)-aziridine,
1-(2-hexyl-amino-ethyl)-2-hydroxyethyl-aziridine,
1-(2-dodecylaminobutyl)-2-phenyl-aziridine,
1-(cyclohexylamino-methyl)-2-hydroxymethyl-aziridine,
1-(phenyl-amino-ethyl)-aziridine,
1-(3-amino-1-methyl-propyl)-aziridine,
1-(3-amino-2-methyl-propyl)-aziridine,
1-(3-methyl-amino-1-methyl-propyl)-aziridine,
(1,3-diamino-2-aziridinyl)-propane,
1-(3-hydroxypropyl)-aziridine,
[2-hydroxy-2'-(1-aziridinyl)-]-diethyl ether,
[2-hydroxy ethyl-2'-(1-aziridinylethyl)]-bis-glycol ether,
1,2-bis-(1-aziridinyl)-1,2-dihydroxy-ethane,
1,2-bis[1-(2-methyl aziridinyl)]-1,2-dihydroxy-ethane
and the like.

Compounds which are particularly preferred are:

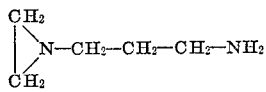

and

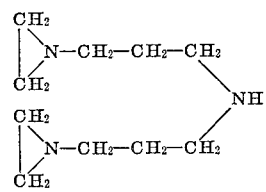

The N-substituted ethylenimines may be prepared by any suitable known process from unsubstituted ethylenimines.

The reaction of the isocyanate-modified polyurethane with the appropriate N-substituted ethylenimine may be carried out either in bulk or in solution. Although the addition reaction is usually exothermic and starts in many cases at room temperature, it is advisable to heat the reaction mixture to complete the reaction. Care should be exercised before the reaction takes place to neutralize any acid constituents present, preferably by means of the addition of a tertiary organic base.

Approximately stoichiometric equivalents of the reactants are used in carrying out reaction although it is frequently advisable to use a small excess of ethylenimine to ensure that the reaction will go to completion. Any excess of the imine will remain unreacted in the reaction mixture and will not interfere with the cross-linking reaction that follows. Where solvents are used, the same solvents mentioned as suitable for the preparation of the prepolymer may be employed, especially if the preparation of the prepolymer was previously carried out in solution.

The addition products formed may be termed iminopolymers and in contrast to tertiary N,N-alkyleneureas from unsubstituted ethylenimines, they contain an aziridine ring isolated from their urethane or urea groups respectively, a factor which has an advantageous effect on their storage stability. In contrast to N,N-alkyleneureas, the iminopolymers obtained in accordance with this invention are strongly basic, and therefore exert an advantageous effect on the subsequent cross-linking reaction with acids or alkylating agents in the finished product.

The iminopolymers obtained are liquid to resinous masses. In order to increase the storage stability of either the solid or solution form of the iminopolymers, it is advantageous to add to the polymers from about 0.5 to 2 percent of any suitable strongly basic compound, which may, if desired, also be in solution. Some such suitable compounds are, for example, diazabicyclooctane, dimethylaminoethylmethylpiperazine, N - dimethylbenzylamine and the like and mixtures thereof.

The cross-linking reaction which follows the preparation of the iminopolymers may be effected in various ways such as, for example, with the aid of alkylating agents, acids, a b-chloroethylurethane or in some cases simply by increasing the temperature.

Some suitable compounds which may be used in the cross-linking reactions are, for example, inorganic or organic acids such as, for example, phosphoric acid, sulfuric acid, hydrochloric acid, acetic acid; and particularly acid anhydrides such as, for example, acetic anhydride, maleic acid anhydride, phthalic acid anhydride; or complex forming compounds which are analogous to acids in their reactions such as, for example, boron trifluoride and the like and mixtures thereof. Some suitable cross-linking alkylating agents include dialkylsulfates such as, for example, dimethyl sulfate, methylethyl sulfate, didecyl sulfate, butylphentyl sulfate and the like and mixtures thereof; dialkylsulfites such as, for example, dimethyl sulfite, dipropyl sulfite, didecyl sulfite, methylethyl sulfite, ethyldecyl sulfite and the like and mixtures thereof; alkylsulfonic acid esters such as, for example, the methyl, ethyl, propyl, butyl, hexyl, decyl, lauryl and the like esters of sulfonic acid and mixtures thereof; aryl sulfonic acid esters such as, for example, the phenyl, naphthyl, phenanthryl, anthryl and the like esters of sulfonic acid and mixtures thereof; benzyl chloride, benzyl bromide and especially aliphatic and aromatic sultones such as, for example, propane sultone, butane sultone, decane sultone, toluene sultone, naphthasultone and the like and mixtures thereof.

Other excellent cross-linking agents are b-chloroethyl urethanes which are readily available from any suitable aliphatic or aromatic isocyanates such as those listed herein as corresponding to the formula RNCO, and b-chloroethanol. These cross-linking agents are practically inactive until heated (for example between about 100° and 150° C.). Further, any of the other suitable crosslinking agents that are soluble in iminopolymers are preferred.

The quantity of cross-linking agent to be used may vary within very wide limits depending on the tendency of the iminopolymers to undergo reaction, the activity of the additive and the desired reaction velocity. As a rule, however, about 0.1 to 10 percent of the crosslinking agent is used. The cross-linking reaction may be carried out at room temperature, either with heating or with cooling. Since crosslinking proceeds exothermically, some means for cooling the reaction mixture must be provided when reacting larger quantities within short reaction times in order to prevent overheating. Depending on the conditions, the reaction may be completed within minutes, hours, or days and in some cases, subsequent heating may be used to increase the solidity of the synthetic resin being formed.

When the iminopolymers of this invention are prepared from a strongly branched polyester or a polyisocyanate component having a functionality greater than about two, such as the trimerization product of 2,4-tolylene diisocyanate, they may be converted into an insoluble synthetic resin without the use of a cross-linking agent by merely heating them, preferably at a temperature of from about 120° to about 180° C.

The cross-linking reaction may be easily and effectively carried out even though the iminopolymer may be diluted or mixed in any desired proportions with alkylene imines, N-substituted alkylene imines or low or high molecular weight compounds containing ethylenimino groups. Further, other additives may also be incorporated into the iminopolymeric material before the cross-linking reaction is carried out. Any such suitable additive may be employed such as, for example, any of the fillers, fibers, glasses, soluble dyes or pigments well known in the art for this purpose.

The products of this invention are particularly suitable in any application for which the isolated aziridine ring makes the polymer peculiarly adapted. For example, they may be used as either cold-hardening casting resins or heat-hardening casting resins in the absence of volatile components. Further, depending on the choice of starting materials, it is possible to produce a product which is either hydrophilic or else strongly hydrophobic or water-repellant. Hence, the products of this invention are particularly suitable in the production of sheet type structures on any suitable substrate, including lacquer coatings, impregnations, finishes on articles, textiles, paper and the like. The products are also eminently suitable as adhesives, especially for materials in which it is particularly important that the adhesive have a high bonding affinity to the substrate to which it is applied, particularly when that substrate is wood, cellulose, a textile, or leather.

The invention is further illustrated but is not intended to be limited by the following examples in which all parts and percentages are by weight unless otherwise specified.

EXAMPLE 1

About 500 parts of a polyether isocyanate prepared from a linear polypropylene glycol ether (OH number 56) and 2,4-tolylene diisocyanate (NCO/OH=2) and having an NCO value of about 3.5 percent are reacted with about 43 parts of 1-amino-3-ethyleniminopropane at room temperature. After the exothermic reaction has subsided, the reaction mixture is stirred for about another half hour and about 4 parts of diazabicyclooctane is then added as stabilizer to the now viscous reaction solution. If about 100 parts of this product are stirred with about 2 parts of propane sultone, the product hardens after several hours at room temperature to form a flexible, rubber-like synthetic resin which is insoluble in all organic solvents.

EXAMPLE 2

(a) About 100 parts of a polyether isocyanate having an NCO value of about 1.5 percent and prepared from a linear polypropyleneglycolether (OH number 56) and 1,6-hexane diisocyanate (the excess of 1,6-hexane diisocyanate being removed by distillation) is reacted with about 4 parts of 1-amino-3-ethyleniminopropane at room temperature. After the addition of about 0.1 percent of diazabicyclooctane as a stabilizer, a viscous, pourable liquid is obtained which cross-links completely within a few minutes to form a soft, insoluble mass with the addition of about 2 to 3 percent of butane sultone at a temperature of from about 130° to 140° C.

(b) When about 100 parts of the polyetherisocyanate of part (a) are stirred with about 3.2 parts of 1-hydroxy-2-ethyleniminoethane at room temperature for a few hours, the reaction is quantitative, and the reaction product may then be cross-linked within a few hours at room temperature with the addition of about 2 parts of benzyl chloride.

EXAMPLE 3

A polypropylene glycol ether ester (OH number 15; acid number 1.0) obtained by esterifying a polypropylene glycol ether (OH number 92) with adipic acid is reacted in known manner with 2,4 tolylene diisocyanate (NCO/OH=2). The polyetheresterisocyanate obtained contains about 0.9 percent NCO groups. The reaction of about 100 parts of the polyetheresterisocyanate with about 2.5 parts of 1-amino-3-ethyleniminopropane leads to an easily pourable reaction product which can be cross-linked to a soft-flexible mass either at room temperature or upon heating in the manner described hereinbefore.

EXAMPLE 4

(a) About 100 parts of a polyether isocyanate having an NCO content of about 6 percent and prepared from a linear polypropylene glycol ether (OH number 112) and 2,4-tolylene diisocyanate are stirred together with a slight excess of 15 parts of 1-amino-3-ethyleniminopropane with cooling. The reaction product obtained is a highly viscous mass at room temperature; it is soluble in all organic solvents and can only be poured when heating.

(b) If cross-linking is carried out by the addition of about 3 percent of b-chloroethylpropylurethane at about 130° to 140° C., a very tough, elastic synthetic resin is obtained. By adding about 15 to about 20 percent of bis-b-ethyleniminobutyric acid ethyl ester (prepared from 2 mols of crotonic acid and 1 mol of ethylene glycol, followed by the addition of 2 mols of ethylenimine), the reaction product of part (a) becomes pourable at room temperature and can be cross-linked to a hard synthetic resin upon heating with butane sultone.

(c) If the prepolymer described in part (a) is reacted with a stoichiometric quantity of 1-amino-3-methyl-(2) ethyleniminopropane, a synthetic resin similar to that obtained in Example 4(b) is obtained after cross-linking.

EXAMPLE 5

About 100 parts of a polyether isocyanate having an NCO content of about 4.4 percent of the solid and prepared from polyethylene glycol ether (OH number 73) and 2,4-tolylene diisocyanate in an acetone solution is reacted with a stoichiometric quantity of 10.5 parts of 1-amino-3-ethylenimino-propane. If this solution is applied to a glass plate together with about 2 percent of propane sultone, a flexible film is obtained after cross-linking. The film is demonstrably hydrophilic and tends to swell in water.

EXAMPLE 6

About 520 parts of a polyester isocyanate (NCO=2.75)

obtained by reacting a polyester prepared from diethylene glycol and adipic acid (OH number 45) with 2,4-tolylene diisocyanate, are dissolved in a mixture of about 170 parts of ethylene glycoletheracetate, about 170 parts of tetrahydrofuran and about 80 parts of dimethylformamide. About 35 parts of 1-amino-3-ethyleneiminopropane and about 5 parts of a diazabicyclooctane stabilizer are added with vigorous stirring. A clear, viscous, stable solution is obtained.

About 100 parts of the solution are mixed with about 2 parts of propane sultone and applied in a thin layer to a glass plate. A clear film which is insoluble in organic solvents and which can be easily lifted from the glass plate is formed within about 5 hours.

EXAMPLE 7

About 300 parts of a polyester prepared from diethylene glycol and adipic acid (OH number 27) are mixed with about 150 parts of ethylene glycoletheracetate and about 153 parts of about 50 percent solution in ethyleneglycoletheracetate of polyisocyanate isocyanurate obtained by polymerizing 2,4-toluylene diisocyanate (NCO value 22.5 percent). The mixture is heated for about 5 hours at about 70° C. to yield a solution of a polyester isocyanate addition product having an NCO value of about 1.7 percent.

After dissolving about 600 parts of this polyester isocyanate in a mixture of about 60 parts of ethyleneglycoletheracetate and about 120 parts of dimethylformamide, about 25 parts of 1-amino-3-ethyleniminopropane are added followed by the addition of about 6 parts of diazabicyclooctane. A clear solution is obtained which, when treated cold with propane sultone or upon heating with butane sultone, yields flexible, glass-clear synthetic resin films after evaporation of the solvent. Only slight yellowing of the films can be detected in the Fade-o-meter after 66 hours of exposure.

EXAMPLE 8

About 300 parts of a polyester amide of hexane-(1,6)-diol, caprolactam and adipic acid (OH number 58) are dissolved in about 300 parts of tetrahydrofuran with heating and stirred for about 2 hours with about 54 parts of 2,4-tolylene diisocyanate to yield an NCO terminated prepolymer having an NCO value of about 2.0 percent. After the solution is cooled, about 100 parts of dimethylformamide are added to it, followed by the addition of about 32 parts of 1-amino-3-ethyleniminopropane. About 3 parts of b-chloroethylphenylurethane are added to about 100 parts of the viscous solution which is obtained, and the resulting solution is then applied to a glass plate. A glass-clear film of synthetic resin with high elongation at break is obtained within about 5 to 10 minutes at about 100° C.

EXAMPLE 9

About 350 parts of a branched polyester (OH number 217), about 350 parts of acetone and about 236 parts of 2,4-tolylene diisocyanate are gradually heated to about 50° C. After several hours a solution of a polyester isocyanate is obtained having an NCO value of about 5.2 percent.

About 300 parts of the solution obtained are added dropwise with cooling and vigorous stirring, to a solution of about 39 parts of 1-amino-3-ethyleniminopropane, about 80 parts of ethanol and about 3 parts of diazabicyclooctane. A clear solution is obtained which, when applied to metal plates, forms hard, scratch-resistant lacquers at temperatures of about 150° to 160° C.

EXAMPLE 10

About 210 parts of a polypropyleneglycolether (OH number 56) and about 22 parts of octanediol are mixed with about 600 parts of about a 50 percent solution of the polyisocyanate of Example 7 and heated for about 12 hours at about 50° C. A solution of an addition product having an NCO value of about 5.0 percent is obtained. About 700 parts of this solution are added dropwise with cooling and vigorous stirring, to a solution of about 85 parts of 1-amino-3-ethyleniminopropane, about 350 parts of ethanol and about 8 parts of diazabicyclooctane. A clear solution is obtained which when coated onto metal sheets yields an insoluble, glossy, scratch-resistant lacquer which firmly adheres to the metal within a few minutes at about 150° to 160° C.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of cross-linked urethanes and ureas containing aziridine rings isolated from the urethane and urea groupings which comprises first preparing an iminopolymer by reacting an N-substituted ethylenimine, the N-substituent of which contains at least one hydrogen atom reactive with an NCO group, with a urethane containing at least two free NCO groups and secondly, cross-linking the iminopolymer.

2. The process of claim 1 wherein the ethylenimine has the formula:

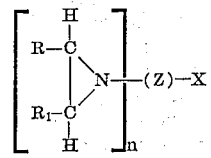

wherein $n$ is an integer of 1 or 2, R and $R_1$ are hydrogen or the same or different alkyl radicals having from 1 to 30 carbon atoms; Z is a branched or straight chain, saturated or unsaturated, hetero-containing or homologous radical having from 2 to 30 carbon atoms and X is OH, NHR or

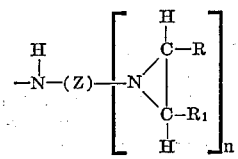

wherein $n$, Z, R and $R_1$ are as herein defined.

3. The process of claim 1 wherein the ethylenimine has the formula:

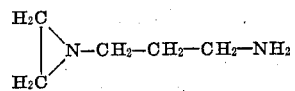

4. The process of claim 1 wherein the ethylenimine has the formula:

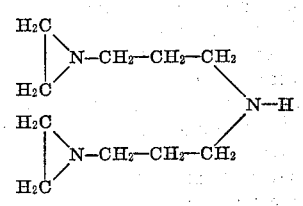

5. The process of claim 1 wherein the reaction is carried out in a solvent.

6. The process of claim 1 wherein the iminopolymer is cross-linked by heating it.

7. The process of claim 1 wherein the iminopolymer is cross-linked by reacting it with an organic acid, an inorganic acid, an acid anhydride, a b-chloroethylurethane or an alkylating agent selected from the group consisting of a dialkylsulfate, a dialkylsulfite, an alkylsulfonic acid ester, an arylsulfonic acid ester, benzyl chloride, benzyl bromide, an aliphatic sultone and an aromatic sultone.

8. The process of claim 7 wherein the concentration of the cross-linking agent is from about 0.1 to about 10 percent by weight based on the weight of the iminopolymer.

9. The process of claim 6 wherein the iminopolymer is heated to from about 120° C. to about 180° C.

10. The product of the process of claim 1.

References Cited

UNITED STATES PATENTS 2,582,614   1/1952   Wohnsiedler et al. __ 260—47 XR

FOREIGN PATENTS 1,057,428   2/1967   Great Britain.
1,353,195   12/1964   France.

DONALD E. CZAJA, Primary Examiner

M. J. WELSH, Assistant Examiner

U.S. Cl. X.R.

117—124, 155; 156—331; 260—47, 77.5